S. Gibson,
Cage Trap
Nº 20,873. Patented July 13, 1858.
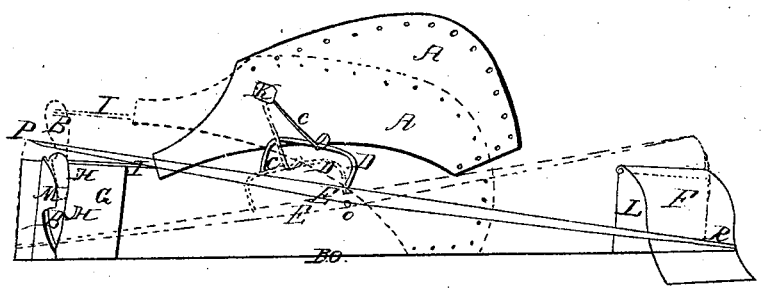
Fig. 1.
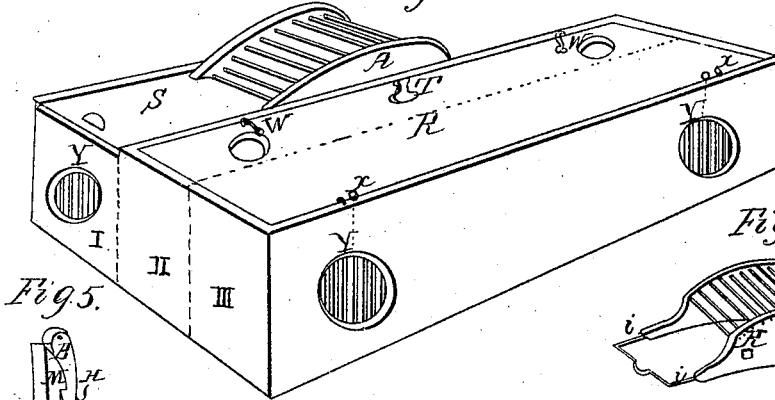
Fig. 2.
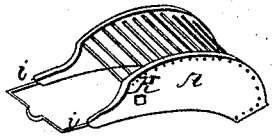
Fig. 4.
Fig. 5.
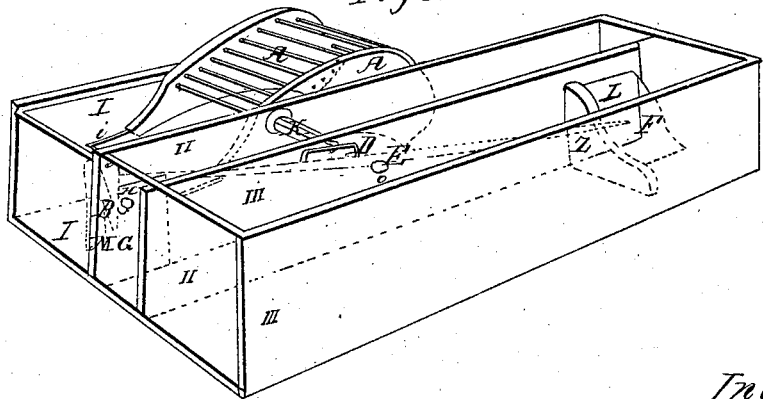
Fig. 3.
Witnesses.
Jacob Stauffer
Daniel G. Baker
Inventor.
Samuel Gibson

UNITED STATES PATENT OFFICE.

SAML. GIBSON, OF MARTIC TOWNSHIP, PENNSYLVANIA.

TRAP FOR ANIMALS.

Specification of Letters Patent No. 20,873, dated July 13, 1858.

*To all whom it may concern:*

Be it known that I, SAMUEL GIBSON, of Martic township, in the county of Lancaster, Pennsylvania, have invented a new and Improved Device for Catching Rats and Mice, called the "Self-Resetting Rat or Mouse Trap;" and I do hereby declare that the following is a full, clear, and exact description of the construction and operation of the same, reference being had to the annexed drawings, making a part of this specification, in which—

Figure 1, represents the position of the several parts, the black lines illustrating the parts in their respective position when the trap is set; the red lines show the position they assume when the trap is down. Fig. II, is a perspective view of the trap when set, with the lid R fastened down and the slide S closed. Fig. III, is the same with the hinged lid and slide removed, showing the partitions and chambers I, II and III; 1st, reception; 2nd, tilting; and 3rd, the retaining, chamber, reference to the letters of each, in the following description of its construction and operation will more fully explain.

The reception chamber I is open at the rear and shorter than the main box or trap. Across this opening is suspended a movable wire cage A. The sides are shown in Fig. I, the dotted lines showing where the wires are inserted; to the projecting arms of which a wire I passes, forming a square in front, with a depressed center, as shown at Fig. 4, passing through and keeping the swinging, nozzled catch B in place, which hooks into the like nozzled, stationary peg M, when the arms of A are depressed, elevating the cage to admit vermin to the baited hook H, on the catch B, in chamber I. The bait slightly acted upon will unship the catch, and the wire cage drips down behind and shuts the victim in; seeking to escape, it enters through an opening G into the tilting chamber II, on to the tilting bottom E, pivoted at O. The openings W, in the lid R admit some light and air; in passing over the center the tilting bottom is elevated in front, and by means of the bent wire D, affixed thereto and the double wire C attached to the arm K, partly revolves the same, depressing the arms of the cage A, causing the swinging catch to fall in place and thus resetting the trap, closing the front opening and revealing one in the rear opening into the retaining chamber III, before which, between the side of the box and closing side piece Z, Fig. III, a valve-like trap-door is suspended, opening inward only, which admits them readily, but effectually prevents a retreat. Thus each succeeding visitor will reset the trap for another, and be snugly housed with its companions, to any number of adventurers for a final execution by the proprietor.

This is a very simple and ingenious trap, a working model of which has proved its efficacy by entrapping to the number of fourteen in a single night.

I do not claim the tilting floor and parts separately; what I claim as my invention and desire to secure by Letters Patent is—

The chambered box, wire drop-cage and tilting bottom when combined and operated substantially as herein set forth.

SAMUEL GIBSON.

Witnesses:
JACOB STAUFFER,
DANIEL G. BAKER.